United States Patent

(12) United States Patent
Ott

(10) Patent No.: US 8,915,526 B1
(45) Date of Patent: Dec. 23, 2014

(54) GRILL ACCESSORY

(71) Applicant: William T. Ott, Kernersville, NC (US)

(72) Inventor: William T. Ott, Kernersville, NC (US)

(*) Notice: Subject to any disclaimer, the term of this patent is extended or adjusted under 35 U.S.C. 154(b) by 0 days.

(21) Appl. No.: 14/195,147

(22) Filed: Mar. 3, 2014

Related U.S. Application Data

(60) Provisional application No. 61/774,013, filed on Mar. 7, 2013.

(51) Int. Cl.
 *F24B 15/00* (2006.01)
 *A47J 45/10* (2006.01)
 *A47J 37/07* (2006.01)

(52) U.S. Cl.
 CPC .............. *A47J 45/10* (2013.01); *A47J 37/0786* (2013.01)
 USPC .................................... 294/9; 294/10; 294/12

(58) Field of Classification Search
 USPC .................. 294/9, 10, 12, 26, 27.1, 7, 15, 32; D7/669, 690, 368; 99/394, 419, 421 A
 See application file for complete search history.

(56) References Cited

U.S. PATENT DOCUMENTS

| | | | | |
|---|---|---|---|---|
| 287,727 A * | 10/1883 | Ross | | 294/15 |
| 1,245,216 A * | 11/1917 | Gohlke | | 294/26 |
| 2,272,112 A * | 2/1942 | Edington | | 294/12 |
| 3,078,020 A * | 2/1963 | Boonstra | | 294/159 |
| D198,097 S * | 4/1964 | Foster | | 294/7 |
| 4,477,112 A * | 10/1984 | Schulke | | 294/27.1 |
| 4,482,181 A | 11/1984 | Shepherd | | 294/12 |
| 4,831,690 A * | 5/1989 | Foegen | | 294/26 |
| 4,836,480 A * | 6/1989 | Besner | | 248/125.3 |
| D358,073 S * | 5/1995 | Eckert | | D8/14 |
| 5,823,589 A * | 10/1998 | Johnston | | 294/7 |
| 6,959,951 B2 * | 11/2005 | Amodeo | | 294/10 |
| D532,659 S * | 11/2006 | Britt et al. | | D7/669 |
| 8,465,068 B1 * | 6/2013 | Vinson, Jr. | | 294/9 |
| 8,579,341 B2 | 11/2013 | Greer | | 294/9 |
| 2013/0111707 A1 | 5/2013 | Mowry | | 16/422 |

* cited by examiner

*Primary Examiner* — Paul T Chin
(74) *Attorney, Agent, or Firm* — MacCord Mason PLLC

(57) ABSTRACT

Grill accessories and food preparation devices are shown and described. In one embodiment, the grill accessory is used to remove a cooking grate from a grill and retain the accessory in a resting position on a ledge or the like. The accessory may include a handle assembly having an upper handle and a lower lateral support. The accessory typically includes at least one prong extension. Further, a vertical support spaces the lateral support and the prong extension. The result is grilling systems and methods to improve grilling and food hygiene practices.

7 Claims, 3 Drawing Sheets

GRILL ACCESSORY

This application claims the benefit of U.S. provisional application No. 61/774,013, filed Mar. 7, 2013, which is incorporated herein by reference in its entirety.

FIELD OF THE TECHNOLOGY

The present disclosure relates generally to grilling accessories, and more particularly to improved cooking grate tool accessories.

BACKGROUND

Grills are popular devices for cooking food by applying heat directly from below the food. Grills are available in a variety of arrangements and sizes to generally provide heat, smoke or the like to prepare food. Often, grills include a cooking grate to position food in a particular manner within the unit, wherein food is generally supported by the removable cooking grate. During the course of cooking and upon completion, it may be advantageous to remove the cooking grate. Conventionally, the user must carefully maneuver the cooking grate to avoid burning himself or causing further damage. In addition, once the cooking grate has been removed, there are additional concerns of how and where to store the cooking grate to minimize heat damage and/or avoid problems associated with food borne illnesses.

Therefore, Applicant desires devices, systems, and methods of manipulating removable cooking grates without the drawbacks presented by the traditional systems and methods.

SUMMARY

In accordance with the present disclosure, grill accessory devices are provided for manipulating a cooking grate and the like. This disclosure provides improved grilling systems and devices that are convenient, efficient, and safe for the user, particularly when used during grilling, refueling, cleaning and similar procedures.

In one embodiment of the present disclosure, a grilling accessory for removing a cooking grate from a grill and securing the cooking grate to a ledge includes an upper handling assembly, a crossbar, a pair of prong extensions, and a vertical support. Typically, the upper handling assembly includes a handle, a lateral support, an enclosed distal end, and an open proximate end. The handle typically includes a proximate end that is generally spaced parallel from a distal end. The lateral support is typically below and substantially parallel to the handle. Further, the lateral support typically includes a proximate end spaced substantially parallel from a distal end. The enclosed distal end typically connects the handle's distal end to the lateral support's distal end. The open proximate end between the handle and the lateral support typically defines an elongated aperture. In addition, the handle's proximate end substantially is typically aligned, or similarly arranged, above the lateral support's proximate end. The crossbar is typically perpendicular to the lateral support. The pair of prong extension typically protrude from opposing ends of the crossbar. The vertical support typically spaces the lateral support and the crossbar. Typically, the elongated aperture is generally adapted to receive, or the like, the ledge to retain the accessory in a cooling position.

In some examples, the handle includes a pair of adjacent rails. Similarly, the lateral support may include a pair of adjacent rails. The cross bar may include a single rail. The vertical support may include a pair of adjacent rails. The prong extensions may extend distally from the crossbar. The prong extensions are generally adapted to remove a variety of removable cooking grates. In some examples, the pair of adjacent rails in the handle may be offset, i.e. spaced apart at one location, from one another on their proximate side defining a storage hook.

Another embodiment of the disclosure includes a grilling accessory having a handle; a lateral support; a handle curvature spacing the handle and the lateral support; a vertical support; and at least one prong extension. In some examples, the handle is angled upward with respect to the lateral support. The handle may include a pair of adjacent rails. Further, the lateral support may include a pair of adjacent rails. In addition, the handle curvature may include a pair of adjacent rails. Also, the vertical support may include a pair of adjacent rails. Typically, the prong extension is adapted to mate with a variety of removable cooking grates.

In particular examples, the accessory may include at least one extension leg protruding from the vertical support. Further the at least one extension leg may connect the prong extension. In yet other examples, the lateral support and the handle define an elongated aperture that is generally adapted to fit over a solid support to retain the accessory in a resting position.

In yet another embodiment of the present disclosure, a grilling accessory for removing a cooking grate from a grill includes a handle assembly, a vertical support, and at least one prong extension. Typically, the handle assembly includes an upper handle and a lower lateral support. Further, the vertical support typically spaces the lateral support and the prong extension. Typically, the lateral support and the handle define an elongated aperture that is generally adapted to fit over a solid support to retain the accessory in a resting position.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
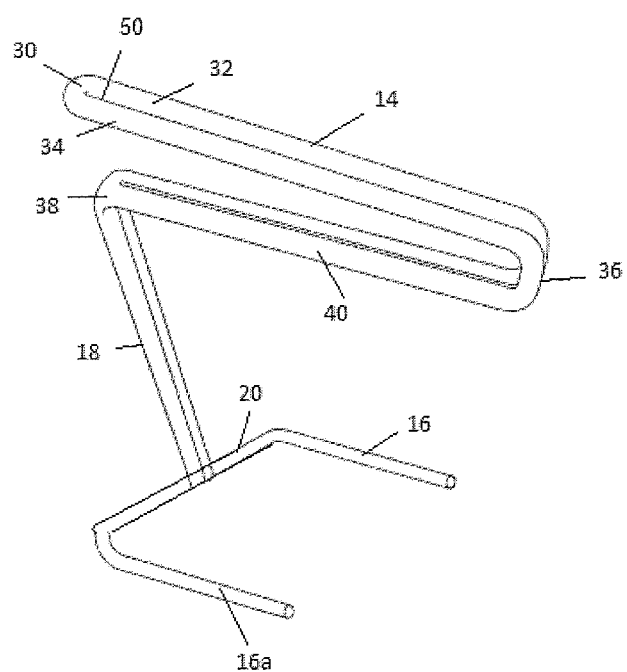
FIG. 1 is a front perspective view of a grill accessory according to the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any invention thereto. As shown in FIG. 1, a grill accessory is shown embodied according to the present disclosure to provide convenient one-hand operation as shown and described herein. The grill accessory may include an upper handling portion 30 comprising a handle 14 to safely remove hot cooking grates, and a lower cooking grate manipulating portion 20 comprising at least one lifting prong. Typically, the grill accessory includes an elongated aperture defined between the handle 14 and lateral support 40 to fit over a ledge 102 of a table, or the like, to retain the accessory in a resting position.

The grill accessory includes at least one lower prong extension to generally mate with a cooking grate (i.e. engage a substantially perpendicular member of the cooking grate) for manipulating the cooking grate. Embodiments of the prong extensions work with various sizes and manufacturer's grates. For instance, the lower prong extension protrudes substantially perpendicular from vertical support 18 to engage, i.e. grab from below, a removable cooking grate or other removable grill feature. As shown in FIG. 1, the grill accessory may include two prong extensions 16, 16*a*. Those of ordinary skill in the art having the benefit of this disclosure will recognize that a variety of prong extensions may be included in the design, for instance three or more prong extensions of the same or differing lengths. The prong extensions may be secured to the vertical support in a variety of ways. In some examples, a cross bar connects the prong assemblies. The crossbar may be substantially perpendicular to the handle 14. Further, each of the prong assemblies may be affixed to the substantially vertical support 18 with an attachment leg. For instance, the attachment legs may be angled downward from the vertical support 18 to the prong extensions 16, 16*a*.

The vertical support 18 may be a variety of lengths, shapes, styles, and sizes for the convenience of its particular application in a grill. For instance, the height of vertical support 18 may vary to space the handle 14 and the prong extensions 16, 16*a* at a particular distance from one another to allow a predetermined spacing for food products to fit between the cooking grate and the handle 14 when being carried and/or rested. In yet other examples, the height of the vertical support 18 may be adjustable, i.e. to allow the user to adjust the spacing between the lower prongs and the handle for a particular application. Other examples include a variety of vertical support shapes, styles, and sizes for the convenience of its user, including, but not limited to, solid backing and the like.

FIG. 1 shows a support curvature 38 positioning the vertical support 18 substantially perpendicular to the lateral support 40. However, in alternative examples, support curvature 38 may position the vertical support 18 in other spatial arrangements with respect to lateral support 40. Typically, the support curvature 38 defines an enclosed distal end, thereby connecting the handle's distal end to the lateral support's distal end. In particular examples, the handle curvature 36 positions the handle 14 at an inclined angle with respect to the plane of the lateral support 40. The Applicant has unexpectedly discovered that such an angled alignment of the handle with respect to the lateral support provides enhanced maneuverability performance and other ergonomic advantages. Additional examples include a variety of angle and spacing arrangements of handle curvature 36 for the convenience of its user.

As shown in FIG. 1, the spacing between the lateral support 40 and the handle 14 provides an elongated aperture. In particular examples, the elongated aperture is adapted to receive (i.e. fit over or the like) the ledge of a table, grill device or the like to support the accessory in any of the resting positions shown and described herein. In addition, the proximate side of handle may include a storage hook 50 between the opposing rails. Other examples include a variety of elongated aperture shapes, styles, and sizes for the convenience of its particular resting application.

Figure 2:
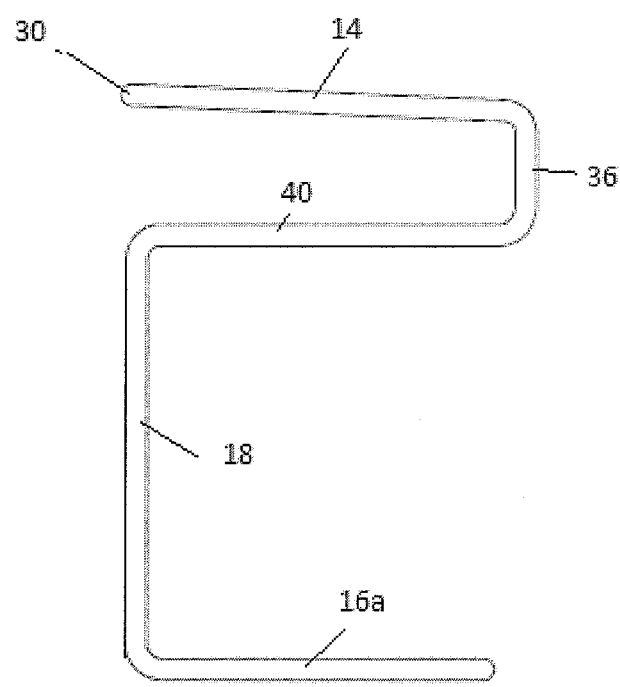
FIG. 2 is a side view of the grill accessory shown in FIG. 1.

Turning now to the side view of the accessory in FIG. 2, the accessory may be a modified "S" shaped. In this example, the "S" begins with an upper portion defined by the handle 14, turning with the handle curvature 36 downward to the lateral support 40. From the lateral support, the accessory turns substantially downward to the vertical support 18. Finally, the cross bar or extension leg turns to the prong extension 16*a*. Other examples include other modified "S-shaped" designs or similar geometric alternatives.

Figure 3:
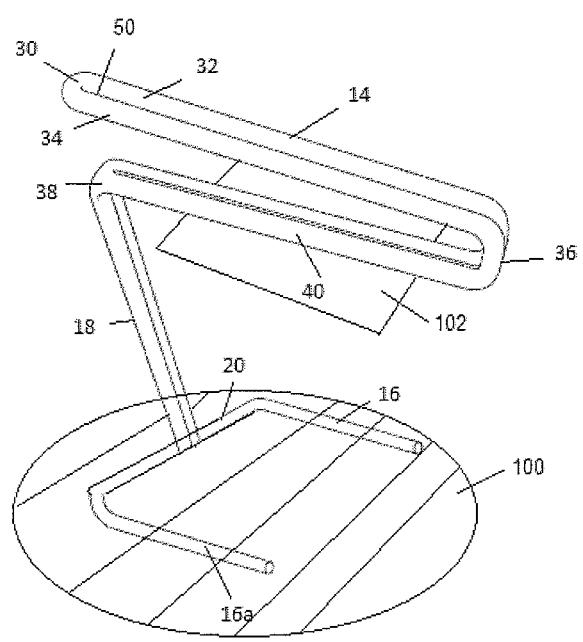
FIG. 3 is a perspective view of the grill accessory shown in FIG. 1, lifting one example of a cooking grate from a grill.

As shown in FIG. 3, the grilling accessory holding a cooking grate 100 in a resting position, i.e. again picking up the accessory with the handle once the accessory is in the resting position. As shown, the lateral support is above the ledge 102 of the table. The handle 14 is spaced above the lateral support to provide sufficient space for the user to manipulate the handle 14 while in the resting position. As shown in this resting position, the ledge 102 of the table (or similar planar support ledge) provides rear support for the accessory, while the vertical support 18 provides front support. In this way, the accessory is supported both horizontally and vertically in the resting position.

Particular uses of the accessory include manipulating and removing a cooking grate 100 from a grill in a variety of ways. The cooking grate 100 may be any type of grate and the grill may be any type of grill. Typically, the prong extensions 16, 16*a* are typically inserted below the surface of the cooking grate 100. The prong extensions are aligned below the perpendicular rails of the cooking grate to provide support for lifting. During this positioning, the user is manipulating the accessory with the upper handle 14, which is spatially separated from the lower assembly so as to provide sufficient relief from heat during this process. Then, the user removes the cooking grate from the grill for any number of purposes, including refueling, allowing foods to rest, cool, cleaning and the like.

In particular examples, the accessory is constructed from stainless steel, including ³⁄₁₆ inch and ¼ inch 304 stainless steel. In any of the embodiments herein, the handle, handle curvature, lateral support and vertical support members may include a dual rail. For instance, as shown throughout the various figures, the handle, handle curvature, lateral support and vertical support members may include two rails 32, 34 adjacent to one another. In particular examples, the two adjacent rails may be connected at the distal ends of the handle to provide as safe, ergonomic grip.

In alternative embodiments, the accessory includes an alternative handle assembly. For instance, the handle assembly may include an enclosed handle running behind and connecting to the lower portion of the vertical support. Additional examples of the handle assembly include any of the elements previously shown and described herein. Still further embodiments may include a horizontal bar with a plurality of notched members for scraping the cooking grid. The horizontal bar with the plurality of notched members may be positioned between the pair of prong extensions, for instance along the crossbar or the like, with the plurality of notched members facing outward away from the crossbar. In particular examples, the notched members are spaced to fit conventional cooking grid rail spacing.

In other embodiments, the disclosure includes a grilling accessory kit. The kit may provide a grill tool to provide a safe and efficient device and process to manipulate a removable cooking grate as shown and described herein. The kit may comprise a handle, e.g. any of the handles previously shown or described. Further, the kit may comprise a prong extension, e.g. any of the prong extensions previously shown or described. In addition, the kit may comprise a vertical support, e.g. any of the vertical supports previously shown or described.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A grilling accessory for removing a cooking grate from a grill and securing said cooking grate to a ledge, said accessory comprising:
   a. an upper handling assembly having
      i. a handle including a proximate end spaced substantially from an opposing end;
      ii. a lateral support below and substantially parallel to said handle, said lateral support including a proximate end spaced substantially from an opposing end;
      iii. an enclosed end connecting said handle to said lateral support; and
      iv. an open proximate end between said handle and said lateral support and defining an elongated aperture, wherein said handle's proximate end substantially aligned above said lateral support's proximate end;
   b. a crossbar perpendicular to said lateral support;
   c. a pair of prong extensions protruding from opposing ends of said crossbar; and
   d. a vertical support spacing said lateral support and said crossbar, and
      wherein said elongated aperture adapted to receive said ledge to retain the accessory in a cooling position.

2. The accessory device of claim 1, wherein said handle includes a pair of adjacent rails.

3. The accessory device of claim 2, wherein said pair of adjacent rails offset from one another on their proximate side defining a storage hook.

4. The accessory device of claim 1, wherein said lateral support includes a pair of adjacent rails.

5. The accessory device of claim 1, wherein said vertical support includes a pair of adjacent rails.

6. The accessory device of claim 1, wherein said prong extensions extend distally from said crossbar.

7. The accessory device of claim 6, wherein said prong extensions are adapted to remove a variety of removable cooking grates.

* * * * *